United States Patent
Hata et al.

(10) Patent No.: US 9,956,954 B2
(45) Date of Patent: May 1, 2018

(54) CONTROL SYSTEM FOR HYBRID VEHICLE

(71) Applicant: TOYOTA JIDOSHA KABUSHIKI KAISHA, Toyota-shi, Aichi (JP)

(72) Inventors: Kensei Hata, Toyota (JP); Yuji Iwase, Toyota (JP); Yosuke Suzuki, Toyota (JP); Koichi Kato, Toyota (JP); Seitaro Nobuyasu, Toyota (JP); Taro Moteki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 15/301,982

(22) PCT Filed: Mar. 17, 2015

(86) PCT No.: PCT/JP2015/058651
§ 371 (c)(1),
(2) Date: Oct. 5, 2016

(87) PCT Pub. No.: WO2015/159649
PCT Pub. Date: Oct. 22, 2015

(65) Prior Publication Data
US 2017/0113679 A1    Apr. 27, 2017

(30) Foreign Application Priority Data
Apr. 16, 2014  (JP) .................. 2014-084386

(51) Int. Cl.
*B60W 20/00* (2016.01)
*B60W 20/50* (2016.01)
(Continued)

(52) U.S. Cl.
CPC ............. *B60W 20/50* (2013.01); *B60K 6/387* (2013.01); *B60K 6/445* (2013.01); *B60W 10/02* (2013.01);
(Continued)

(58) Field of Classification Search
CPC .... B60W 20/50; B60W 20/13; B60W 50/032; B60W 10/26; B60W 50/029;
(Continued)

(56) References Cited

U.S. PATENT DOCUMENTS 5,788,006 A    8/1998  Yamaguchi
6,484,832 B1 * 11/2002 Morisawa ................ B60K 6/44
                                                            180/65.225
(Continued)

FOREIGN PATENT DOCUMENTS

JP    H08-295140 A    11/1996
JP    2009-274566 A   11/2009
(Continued)

*Primary Examiner* — Mary D Cheung
(74) *Attorney, Agent, or Firm* — Oliff PLC (57) ABSTRACT

A control system for hybrid vehicle for extending a possible travelling distance of the vehicle in the event of clutch failure is provided. The control system is configured to select a first drive mode in which the vehicle is powered by an engine in case an estimated torque transmitting capacity of the clutch in trouble is larger than a first threshold value, and to select a second drive mode in which the vehicle is powered by a motor in case the estimated torque transmitting capacity of the clutch in trouble is smaller than the first threshold value. The control system is further configured to reduce an engine torque to be smaller than the estimated torque transmitting capacity of the clutch in case the first drive mode is selected.

5 Claims, 9 Drawing Sheets

(51) Int. Cl.

| | |
|---|---|
| *B60K 6/387* | (2007.10) |
| *B60K 6/445* | (2007.10) |
| *B60W 50/029* | (2012.01) |
| *B60W 50/032* | (2012.01) |
| *B60W 10/02* | (2006.01) |
| *B60W 10/06* | (2006.01) |
| *B60W 10/08* | (2006.01) |
| *B60W 10/26* | (2006.01) |
| *B60W 20/40* | (2016.01) |
| *B60W 20/13* | (2016.01) |
| *F16H 48/10* | (2012.01) |
| *B60K 6/48* | (2007.10) |
| *B60W 50/02* | (2012.01) |

(52) U.S. Cl.
CPC .......... *B60W 10/06* (2013.01); *B60W 10/08* (2013.01); *B60W 10/26* (2013.01); *B60W 20/13* (2016.01); *B60W 20/40* (2013.01); *B60W 50/029* (2013.01); *B60W 50/032* (2013.01); *F16H 48/10* (2013.01); *B60K 2006/4825* (2013.01); *B60W 2050/022* (2013.01); *B60W 2050/0297* (2013.01); *B60W 2510/0275* (2013.01); *B60W 2510/08* (2013.01); *B60W 2510/242* (2013.01); *B60W 2510/244* (2013.01); *B60Y 2300/18008* (2013.01); *Y02T 10/6239* (2013.01); *Y02T 10/6252* (2013.01); *Y02T 10/6286* (2013.01); *Y10S 903/946* (2013.01)

(58) Field of Classification Search
CPC ...... B60W 10/02; B60W 10/06; B60W 10/08; B60W 20/40; B60W 2510/08; B60W 2510/242; B60W 2050/022; B60W 2050/0297; B60W 2510/244; B60W 2510/0275; F16H 48/10; B60K 6/445; B60K 6/387; B60K 2006/4825; B60Y 2300/18008; Y10S 903/946; Y02T 10/6286; Y02T 10/6252; Y02T 10/6239
See application file for complete search history.

(56) References Cited

U.S. PATENT DOCUMENTS

| | | | | |
|---|---|---|---|---|
| 2011/0077810 | A1* | 3/2011 | Katou | B60W 10/108 |
| | | | | 701/22 |
| 2012/0089285 | A1 | 4/2012 | Nissato | |
| 2012/0239237 | A1* | 9/2012 | Hashimoto | B60K 6/365 |
| | | | | 701/22 |
| 2015/0066265 | A1* | 3/2015 | Martin | B60W 20/15 |
| | | | | 701/22 |
| 2015/0314771 | A1* | 11/2015 | Dextreit | B60W 50/082 |
| | | | | 701/22 |
| 2016/0272192 | A1* | 9/2016 | Ashizawa | B60W 10/11 |

FOREIGN PATENT DOCUMENTS

| | | |
|---|---|---|
| JP | 2010-188776 A | 9/2010 |
| JP | 2011-230706 A | 11/2011 |
| JP | 2012-081811 A | 4/2012 |
| JP | 2013-001182 A | 1/2013 |

* cited by examiner

| Drive Mode | K0 Clutch Engagement : O Disengagement : — |
|---|---|
| Disconnecting EV | — |
| Normal EV | O |
| HV | O |

CONTROL SYSTEM FOR HYBRID VEHICLE

TECHNICAL FIELD

The present invention relates to a control system for a hybrid vehicle comprising an engine, a motor, and an engagement device for selectively interrupting torques of the engine and the motor transmitted to driving wheels.

BACKGROUND ART

JP-A-08-295140 describes a hybrid vehicle in which torques of an engine and a first motor is delivered to driving wheels. The hybrid vehicle is provided with a differential gear unit including a first rotary element connected to an output shaft through a clutch, a second rotary element connected to the first motor, and a third rotary element connected to the driving wheels, and further provided with a second motor generating a torque delivered to the driving wheels from downstream side of the third rotary element. In the hybrid vehicle taught by JP-A-08-295140, a drive mode can be selected from a hybrid mode in which the clutch is brought into engagement to transmit torques of the engine and the first motor to the driving wheels, and an EV mode in which the clutch is brought into disengagement to transmit only torque of the second motor to the driving wheels.

Control systems for the hybrid vehicle thus having a clutch for selectively interrupting a torque transmission between the prime mover and the driving wheels are also described in JP-A-2012-081811, JP-A-2011-230706, JP-A-2010-188776 and JP-A-2009-274566 respectively. For example, JP-A-2012-081811 describes a control device configured to inhibit the EV running in which the driving wheels are rotated only by power of the motor, in case torques of the engine and the motor cannot be interrupted due to failure so as to avoid occurrence of secondary failure.

JP-A-2011-230706 describes a hybrid vehicle in which a clutch is disposed between an engine and a motor, and a gear train connects an output shaft of the motor and the driving wheels in series. In the hybrid vehicle, the power of the engine is transmitted to the motor so that the motor serves as a generator. According to the teachings of JP-A-2011-230706, therefore, the control device is configured to reduce a discharging amount of a battery while increasing a threshold value for determining a reduction in an SOC level, so as to prevent an excessive reduction in the SOC level in case torques of the engine and the motor cannot be interrupted by failure.

JP-A-2010-188776 describes a hybrid vehicle, in which a motor is connected to an output shaft of an engine, and a transmission is connected to an output shaft of the motor. In the hybrid vehicle of this kind, if the vehicle is powered only by the motor under a situation that a torque transmission of the engine and the motor cannot be interrupted due to failure, a power loss will be caused to rotate the engine passively. That is, the motor is required to generate a large power to keep propelling the vehicle. As a result, an electric consumption is increased and hence a cruising distance in a motor running mode is shortened. According to the teachings of JP-A-2010-188776, therefore, the engine is activated even if a condition of motor running mode is satisfied so as to reduce a power loss to rotate the engine passively, under a situation that the torque transmission of the engine and the motor cannot be interrupted due to failure. In this case, if the SOC of the battery is sufficient, the vehicle is allowed to be powered only by the motor without activating the engine.

JP-A-2009-274566 also describes a hybrid vehicle in which an output shaft of an engine is connected to a generator, an output shaft of the generator is connected to driving wheels through a clutch, and a motor to which power is applied from the generator is connected to an output side of the clutch. According to the teachings of JP-A-2009-274566, a so-called "series mode" in which a power of the engine is converted into electric power by the generator to power the vehicle only by the motor is inhibited when the clutch cannot be brought into disengagement by failure. By contrast, when the clutch cannot be brought into engaging completely while causing slip by failure, the vehicle is powered only by the motor without activating the engine.

JP-A-2013-001182 also describes a power transmission control device for a hybrid vehicle in which an output shaft of the engine is connected to an input shaft of the transmission trough a manual clutch, and an output shaft of the transmission is connected to a motor. According to the teachings of JP-A-2013-001182, the EV mode is inhibited or an output torque of the motor is restricted in the event of failure of a sensor of a clutch pedal.

SUMMARY OF INVENTION

Technical Problem

However, if the vehicle is powered only by the motor under the condition that the clutch cannot be brought into engagement completely due to failure, as taught by JP-A-2009-274566, battery power will be continuously consumed and hence the vehicle is not allowed to travel over a long distance.

Aspects of preferred embodiments have been conceived noting the foregoing technical problems, and it is therefore an object of the present invention is to provide a control device for a hybrid vehicle configured to extend a possible travelling distance in the event of failure of a clutch arranged between the engine and the motor.

Solution to Problem

The control system according to the present invention is applied to a hybrid vehicle having an engine, a motor, an engagement device that is disposed between the engine and the motor to selectively enable a torque transmission between the engine and the motor and between the engine and driving wheels, and a control unit for selecting a drive mode of the vehicle. In order to achieve the above-mentioned objectives, according to the present invention, the control unit is configured to: determine an occurrence of failure in which a torque transmitting capacity of the engagement device cannot be altered; estimate the torque transmitting capacity of the engagement device; select a first drive mode in which the vehicle is powered by the engine in case the occurrence of failure of the engagement device is determined and the estimated torque transmitting capacity of the engagement device is larger than a first threshold value; select a second drive mode in which the vehicle is powered by the motor in case the occurrence of failure of the engagement device is determined and the estimated torque transmitting capacity of the engagement device is smaller than the first threshold value; and reduce a torque of the engine to be smaller than the estimated torque transmitting capacity of the engagement device in case the first drive mode is selected.

The control unit may be further configured to try to bring the engagement device into engagement again during the vehicle is stopping, in case the occurrence of failure of the engagement device is determined.

The control unit may be further configured to select the first drive mode in case the estimated torque transmitting capacity of the engagement device is larger than the first threshold value and a state of charge of a battery storing electricity delivered to the motor is lower than a second threshold value, and to select the second drive mode in case the estimated torque transmitting capacity of the engagement device is larger than the first threshold value and the state of charge of the battery storing electricity delivered to the motor is higher than the second threshold value.

Specifically, the second threshold value is set to be higher than a third threshold value as a lowest level of the state of charge to charge the battery under the normal condition of the engagement device.

The hybrid vehicle to which the control system of the present invention is applied is further provided with a differential mechanism comprising a first rotary element connected to the engine to serve as an input element, a second rotary element connected to the driving wheels to serve as an output element, and a third rotary element connected to a generator to serve as a reaction element. The aforementioned motor is connected to any of the first rotary element and the second rotary element.

Advantageous Effects of Invention

Thus, in case the torque transmitting capacity of the engagement device cannot be altered by failure and the estimated torque transmitting capacity of the engagement device in trouble is larger than a first threshold value, the first drive mode is selected to power the vehicle by the engine. In this case, output torque of the engine is reduced to be smaller than the estimated torque transmitting capacity of the engagement device. According to the present invention, therefore, the vehicle is allowed to be powered by the engine without worsening a slippage of the engagement device in trouble so that the battery can be charged without consuming electricity. For this reason, the vehicle is allowed to travel over a long distance in the event of failure of the engagement device. In addition, in case the first drive mode still can be selected in the event of failure of the engagement device, sufficient driving force and braking force can be ensured in comparison with those under the second drive mode.

According to another aspect of the present invention, the control system tries to bring the engagement device into engagement again during the vehicle is stopping in the event of failure of the engagement device. Therefore, the torque transmitting capacity of the engagement device may possibly be increased to a level sufficient to crank the engine so that the opportunity to establish the first drive mode can be increased. For this reason, the electric power of the battery may be saved so that a traveling distance of the vehicle may possibly be extended even if the engagement device is still in trouble. In addition, since such attempt of engagement of the engagement device is executed in the stopping vehicle, shocks and noises will not be caused.

According to still another aspect of the present invention, the drive mode of the vehicle may also be selected depending on the state of charge of the battery in the event of failure of the engagement device. Specifically, the first drive mode is selected in case the state of charge of a battery is lower than the second threshold value, and the second drive mode is selected in case the state of charge of the battery is higher than the second threshold value. Therefore, overcharging and overconsumption of the battery can be prevented so that the possible traveling distance of the vehicle in the event of failure of the engagement device can be extended.

Specifically, the second threshold value of the state of charge of the battery is set to be higher than the third threshold value as the lowest level of the state of charge to charge the battery under the normal condition of the engagement device. Therefore, a torque drop of the motor will not be caused by an excessive reduction in the state of charge of the battery so that the drive force of the motor can be ensured in the event of failure of the engagement device.

As described, the differential mechanism used in the vehicle to which the control system is applied is comprised of the first rotary element connected to the engine, the second rotary element connected to the driving wheels, and the third rotary element connected to the generator. Therefore, the generator is allowed to be rotated in the stopping vehicle by the engine to generate electricity. For this reason, the possible traveling distance of the vehicle after restarting can be extended.

DESCRIPTION OF EMBODIMENTS

Figure 4:
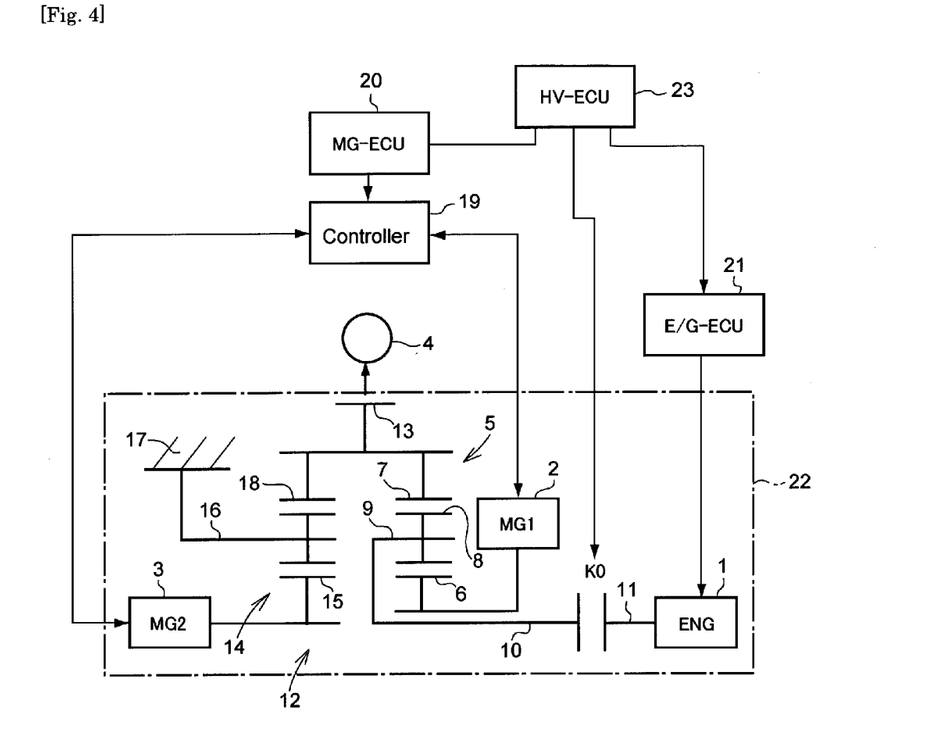
FIG. 4 is a skeleton diagram schematically showing a first example of the vehicle to which the control system of the invention is applied.

The vehicle control system of preferred embodiment is applied to a vehicle having an engine and a motor each generating torque to transmit to driving wheels, and an engagement device that interrupts the torque transmissions both between the engine and the motor and between the engine and the driving wheels by disengaging. A preferred example of the vehicle to which the preferred embodiment is applied is illustrated in FIG. 4. The vehicle shown in FIG. 4 is a hybrid vehicle comprised of an engine (ENG) 1, and motors 2 (MG1) and 3 (MG2). The vehicle shown in FIG. 4 can be driven not only by the engine 1 but also by a combination of the engine 1 and the motor 2 (3). In addition, the vehicle can also be driven only by the motor 3. The motor 2 and 3 are adapted to regenerate energy while the vehicle is running. When the vehicle is driven by the motor 3, the engine 1 is allowed to be stopped and restarted. Under EV mode in which the motor 3 is used as a prime mover for driving the vehicle, it is preferable to reduce a power loss resulting from rotating the engine 1 and the motor 2 concurrently. To this end, a clutch K0 is disposed on a power train 12 for transmitting power of the engine 1 to the driving wheels 4 so as to selectively disconnect the engine 1 from the power train 12.

In the vehicle shown in FIG. 4, the power of the engine 1 is partially transmitted to the driving wheel 4 by a mechanical means. Remaining power of the engine 1 is once converted into an electric power, and then converted into a mechanical power again to be transmitted to the driving wheels 4. In order to distribute the power of the engine 1, a power distribution device 5 is disposed on the power train 12. As the conventional two-motor type hybrid drive units, a single-pinion type planetary gear unit adapted to perform a differential action using three rotary elements is used as the power distribution device 5. Specifically, the power distribution device 5 is comprised of: a sun gear 6; a ring gear 7 arranged concentrically with the sun gear 6; a pinion gear 8 meshing with both the sun gear 6 and the ring gear 7; and a carrier 9 holding the pinion gear 8 in a manner such that the pinion gear 8 is allowed to rotate and revolve around the sun gear 8. Accordingly, the power distribution device 5 serves as the claimed differential mechanism, the carrier 9 serves as the claimed first rotary element, the ring gear 7 serves as the claimed second rotary element, and the sun gear 6 serves as the claimed third rotary element.

Specifically, the carrier 9 is connected to an input shaft 10 to serve as an input element. The aforementioned clutch K0 is disposed between the input shaft 10 and an output shaft (i.e., a crankshaft) 11 of the engine 1. The clutch K0 is adapted to selectively connect and disconnect the engine 1 to/from the power distribution device 5 disposed on the power train 12. For example, a conventional dry-type or wet-type friction clutch may be used as the clutch K0. Therefore, a torque transmitting capacity of the clutch K0 can be changed gradually from a completely disengaged state until being engaged completely without causing a slip. Accordingly, the clutch K0 serves as the claimed engagement device. Alternatively, other kinds of engagement device actuated by a hydraulic actuator, an electromagnetic actuator etc. may also be used as the clutch K0.

The first motor 2 establishes a reaction against the torque applied to the power distribution device 5 through the clutch K0. To this end, the first motor 2 is connected to the sun gear 6, and outputs a torque in an opposite direction against the torque rotating the first motor 2. In the preferred examples, a permanent magnet synchronous motor having a generating function, i.e., a motor-generator is used as the first motor 2. Accordingly, the first motor 2 serves as the claimed generator. The ring gear 7 as the output element is integrated with the output gear 13 to output a driving force to the driving wheels 4. Here, although not especially shown in FIG. 4, the vehicle illustrated therein is provided with a conventional differential gear unit, a drive shaft and so on to transmit the torque from the output gear 13 to the driving wheels 4.

The engine 1, the power distribution device 5 and the first motor 2 are arranged on a common axis, and the second motor 3 is arranged coaxially therewith but separated. The second motor 3 is also a permanent magnet synchronous motor that is adapted not only to generate a driving force but also to regenerate energy. That is, the second motor 3 is also a motor-generator. The second motor 3 is connected with the aforementioned output gear 13 through a speed reduction device 14. Specifically, a single-pinion type planetary gear unit is also used as the speed reduction device 14, and as shown in FIG. 4, a sun gear 15 is connected with the second motor 3, a carrier 16 is fixed to a stationary portion 17 such as a housing, and a ring gear 18 is integrated with the output gear 13.

Those motors 2 and 3 are electrically connected with a controller 19 comprising an electric storage device and an inverter. In order to control the controller 19, an electric control unit (as will be called MG-ECU hereinafter) 20 is connected to the controller 19. The MG-ECU 20 is composed mainly of a microcomputer configured to carry out a calculation based on preinstalled data and data or command signal to be inputted thereto, and to output a calculation result to the controller 19 in the form of command signal. Accordingly, the motors 2 and 3 are operated as the motor or generator based on the command signal from the controller 19, and torques thereof are also controlled by the controller 19.

The engine 1 is started and stopped electrically. Specifically, if the engine 1 is a gasoline engine, an opening degree of a throttle valve, a feeding amount of fuel, a cessation of fuel delivery, an execution, a cessation and a timing of ignition etc. are controlled electrically. For this purpose, another electronic control unit (as will be called E/G-ECU hereinafter) 21 is connected with the engine 1. The E/G-ECU 21 is also composed mainly of a microcomputer configured to carry out a calculation based on preinstalled data and data or command signal to be inputted thereto, and to output a calculation result to the engine 1 in the form of command signal.

Thus, a prime mover 22 is comprised of the engine 1, the motors 2 and 3, the clutch K0 and the power distribution device 5, and still another electronic control unit (as will be called HV-ECU hereinafter) 23 is provided to control the prime mover 22. The HV-ECU 23 is also composed mainly of a microcomputer configured to carry out after-explained controls by sending command signals to the MG-ECU 20 and the E/G-ECU 21.

Figure 5:
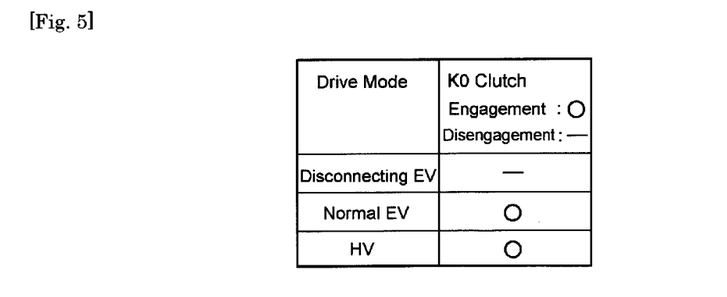
FIG. 5 is table showing an engagement state of the clutch under each drive mode of the vehicle shown in FIG. 4.

A drive mode of the vehicle shown in FIG. 4 is selected from hybrid mode (abbreviated as HV mode) in which the vehicle is driven by the power of the engine 1, and electric vehicle mode (abbreviated as EV mode) in which the vehicle is driven by the electric power. Specifically, the EV mode can be selected from disconnecting EV mode in which the engine 1 is disconnected from the power train 12, and normal EV mode in which the engine 1 is connected with the power train 12. FIG. 5 is a table showing an engagement status of the clutch K0 under each drive mode. As can be seen from FIG. 5, the clutch K0 is disengaged under the disconnecting EV mode. In contrast, the clutch K0 is engaged under the normal EV mode and the HV mode.

Specifically, the drive mode of the vehicle is selected from the HV mode, the disconnecting EV mode and the normal EV mode depending on a running condition of the vehicle such as an opening degree of accelerator, a drive demand, a vehicle speed, a state of charge (abbreviated as SOC hereinafter) of electric storage device and so on. For example, when a relatively large driving force is demanded, the HV mode is selected to generate the driving force mainly by the engine 1. To the contrary, when a demanded driving force is relatively small, the normal EV mode or the disconnecting EV mode is selected to power the vehicle by the driving force generated by the second motor 3, without generating the driving force by the engine 1. Likewise, when the vehicle speed is relatively high, the HV mode is selected. To the contrary, when the vehicle speed is relatively low, the normal EV mode or the disconnecting EV mode is selected. Accordingly, the HV mode corresponds to the claimed first drive mode, and the EV mode corresponds to the claimed second drive mode.

Specifically, the normal EV mode and the disconnecting EV mode are switched based on various kinds of conditions other than the demanded driving force and the vehicle speed. For example, the normal EV mode is selected if there is a high possibility to restart the engine 1 being stopped automatically, and the disconnecting EV mode is selected if it is necessary to reduce a power loss resulting from rotating the engine 1 concurrently when the vehicle is driven only by the power of the second motor 3.

Figure 6:
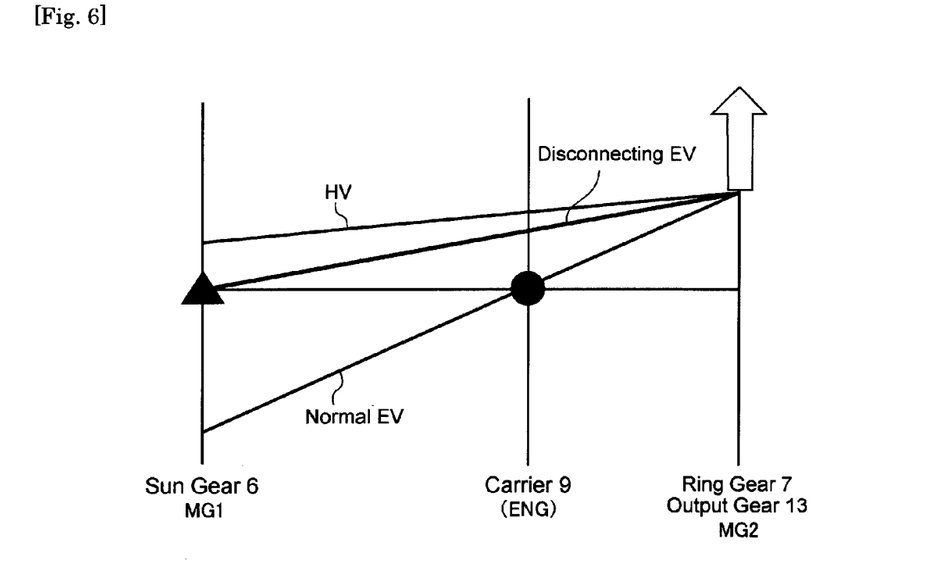
FIG. 6 is a nomographic diagram showing operating states of the rotary members under each drive mode.

Here will be explained an operating state of the hybrid drive unit under each drive mode. FIG. 6 is a nomographic diagram of the dower distribution device 5. In FIG. 6, each vertical line individually represents the sun gear 6, the carrier 9 and the ring gear 7, and clearances between the sun gear 6 and the carrier 9 and between the carrier 9 and the ring gear 7 are individually determined in accordance with a gear ratio of the planetary gear unit serving as the power distribution device 5. In addition, the vertical direction represents a rotational direction, and a rotational speed is represented at a vertical position. In FIG. 8, the diagonal line as indicated "Disconnecting EV" represents an operating state under the disconnecting EV mode. Under the disconnecting EV mode, the second motor 3 is used as a motor to drive the vehicle. In this situation, the engine 1 is stopped and disconnected from the power train 12 by disengaging the clutch K0, and the first motor 2 is also stopped. Therefore, the sun gear 6 is not rotated, the ring gear 7 is rotated together with an output gear 25 in the forward direction, and the carrier 9 is rotated in the forward direction at a speed reduced in accordance with the gear ratio of the power distribution device 5.

In FIG. 6, the diagonal line as indicated "Normal EV" represents an operating state under the normal EV mode. Under the normal EV mode, the vehicle is driven by the power of the second motor 3, and the engine 1 is stopped. In this situation, therefore, the carrier 9 is stopped, the ring gear 7 is rotated in the forward direction, and the sun gear 6 is rotated in the backward direction. In addition, the first motor 2 can be used as a generator in this situation.

In turn, the diagonal line as indicated "HV" in FIG. 6 represents an operating state under the HV mode. Under the HV mode, the clutch K0 is engaged and the engine 1 generates the driving force so that the carrier 9 is rotated by the torque in the forward direction. In this situation, a counter torque is applied to the sun gear 6 by operating the first motor 2 as a generator. Consequently, a torque to rotate in the forward direction will appear on the ring gear 7. In this case, the electric power generated by the first motor 2 is delivered to the second motor 3. Therefore, the second motor 3 is driven as a motor and a driving force thereof is transmitted to the output gear 13. Thus, under the HV mode, the power of the engine 1 is partially transmitted to the output gear 13 through the power distribution device 5. The remaining power of the engine 1 is converted into an electric power by the first motor 2 and delivered to the second motor 3. Then, the electric power thus delivered to the second motor 3 is converted into a mechanical power again and delivered to the output gear 13. Such energy regeneration is carried out irrespective of selected drive mode by operating any one of the motors 2 and 3 as a generator, under the situation that the prime mover is not required to output the driving force aggressively. Optionally, under the HV mode, an engine braking force resulting from a pumping loss of the engine can be applied to the vehicle. In addition, under the HV mode, electric powers can be supplied to the second motor 3 not only from the first motor 2 but also from the battery.

When the drive mode is shifted from the EV mode to the HV mode, the engine 1 is cranked by a torque transmitted thereto through the clutch K0. Specifically, the engine 1 may be cranked not only by a torque of any one of the motors 2 and 3 but also by a synthesized torque of the motors 2 and 3. Further, the engine 1 may also be cranked by an inertia torque delivered from the driving wheels 4.

In the event of failure on the clutch K0 involved in the cranking of the engine 1, for example, in case a movable member of the clutch K0 cannot slide or the actuator controlling actuation of the clutch K0 is in trouble, it is preferable to select the drive mode depending on a torque transmitting capacity of the clutch K0 in trouble. For example, if a clutch failure occurs under the EV mode, the electric power of the battery would be consumed significantly by the second motor 3 to propel the vehicle and hence the vehicle cannot travel over a long distance in this situation. Therefore, if the situation allows, it is preferable to propel the vehicle under the HV mode during clutch failure.

Figure 1:
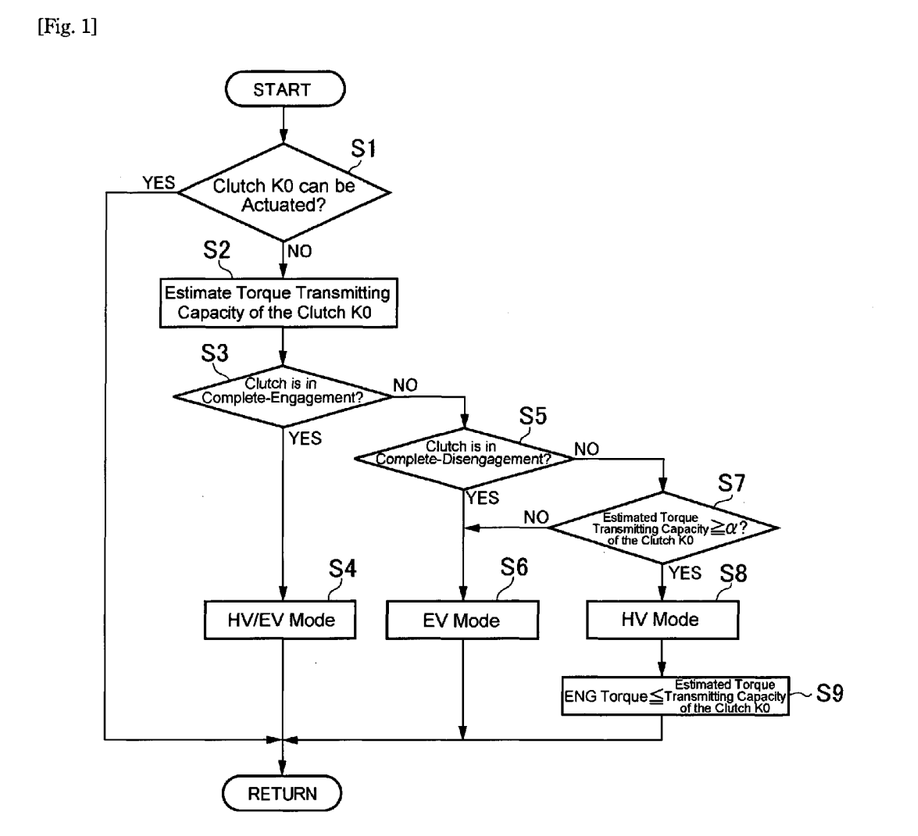
FIG. 1 is a flowchart showing a control example according to the present invention.

To this end, according to the preferred embodiment, the HV mode is selected if a torque transmitting capacity of the clutch K0 in trouble is sufficient to crank the engine 1. Referring now to FIG. 1, there is shown a control example to select the HV mode depending on the torque transmitting capacity of the clutch K0 in trouble, and the routine shown therein is repeated at predetermined intervals. At step S1, it is determined whether or not the clutch K0 can be actuated to be brought into engagement or disengagement. That is, an occurrence of a failure in which the torque transmitting capacity of the clutch K0 cannot be altered is determined. Specifically, such determination of step S1 can be made by determining whether or not a ratio or a difference of actual rotational speeds between the output shaft 11 and the input shaft 10 is larger than that calculated based on the signal from the HV-ECU 23 in a predetermined amount.

If the clutch K0 can be actuated so that the answer of step S1 is YES, the torque transmitting capacity of the clutch K0 can be altered arbitrarily and hence the routine is returned. By contrast, if that clutch K0 cannot be actuated so that the answer of step S1 is NO, a torque transmitting capacity of the clutch K0 is estimated at step S2. Given that the clutch K0 in trouble is a dry-type friction clutch, the torque transmitting capacity thereof can be estimated based on a stroke of a jamming member of the clutch K0. In turn, given that the clutch K0 in trouble is a wet-type friction clutch, the torque transmitting capacity thereof can be estimated based on a command value of a hydraulic pressure or an electric power transmitted to the actuator for the clutch K0.

Then, at step S3, it is determined whether or not the clutch K0 is in complete-engagement without slipping. Specifically, such determination of step S3 can be made based on whether or not an actual torque transmitting capacity of the clutch K0 in trouble is identical to a maximum torque transmitting capacity of the clutch K0 in normal condition. Alternatively, the determination of step S3 can also be made based on based on a stroke of a jamming member of the clutch K0, or based on a command value of a hydraulic pressure or an electric power transmitted to the actuator for the clutch K0.

If the clutch K0 is in complete-engagement so that the answer of the step S3 is YES, the engine 1 can be cranked by transmitting torque to the engine 1 through the clutch K0. In this case, the drive mode can be switched between the HV mode and the normal EV mode according to need. Accordingly, the drive mode is selected from the HV mode or the normal EV mode according to need at step S4, and the routine is returned. Here, the HV mode and the normal mode are selected in accordance with a required driving torque, a required braking torque or an SOC of the battery.

In contrast, if the clutch K0 is not in complete-engagement so that the answer of the step S3 is NO, it is determined whether or not the clutch K0 is in complete-disengagement where the torque transmitting capacity thereof is "0" at step S5. Specifically, such determination of step S5 can be made based on the estimated torque transmitting capacity of the clutch K0, or based on a command value of a hydraulic pressure or an electric power transmitted to the actuator for the clutch K0. If the clutch K0 is in complete-disengagement so that the answer of the step S5 is YES, torque of the engine 1 cannot be transmitted to the driving wheels 4 through the clutch K0 and hence the EV mode is selected at step S6. Then the routine is returned. In this case, since the clutch K0 is in complete-disengagement, the vehicle is driven under the disconnecting EV mode.

To the contrary, if the clutch K0 is not in complete-disengagement so that the answer of step S5 is NO, namely, if the estimated torque transmitting capacity of the clutch K0 is larger than "0" but smaller than the maximum value, it is determined whether or not a torque sufficient to crank the engine 1 can be transmitted to the engine 1 at step S7. At step S7, specifically, it is determined whether or not the estimated torque transmitting capacity of the clutch K0 is larger than a predetermined first threshold value α possible to transmit torque required to crank the engine 1 without slipping in the clutch K0. To this end, the first threshold value α is determined in accordance with characteristics of the engine 1.

If the estimated torque transmitting capacity of the clutch K0 is smaller than the first threshold value α so that the answer of the step S7 is NO, the engine 1 cannot be started and hence the EV mode is selected at step S6. Then the routine is returned. In this case, the clutch K0 still transmits the torque to a certain extent depending on a degree of engagement and a drive force generated by the second motor 3 would be reduced by a friction torque of the engine 1. In order to avoid such reduction in the drive force, therefore, it is preferable to generate a torque larger than the required drive torque by the second motor 3 so as to overcome the friction torque of the engine 1.

In contrast, if the estimated torque transmitting capacity of the clutch K0 is larger than the first threshold value α so that the answer of the step S7 is YES, the engine 1 can be cranked to be started and hence the HV mode is selected at step S8. Since a static friction coefficient is basically larger than a dynamic friction coefficient, a larger torque can be transmitted in case the clutch K0 is in complete engagement without slipping, in comparison with the case in which the clutch K0 is in partial engagement while slipping. In case the HV mode is thus selected at step S8, therefore, the torque of the engine 1 is reduced at step S9 to be lower than the estimated torque transmitting capacity of the clutch K0 so as to prevent slippage of the clutch K0, and then the routine is returned.

As described, the determinations of steps S3 and S4 may also be made based on parameters other than the estimated torque transmitting capacity of the clutch K0. Therefore, step S2 at which the torque transmitting capacity of the clutch K0 is estimated may also be carried out any time prior to step S7 at which the estimated torque transmitting capacity of the clutch K0 is compared to the first threshold value α. In addition, if the torque transmitting capacity of the clutch K0 is continuously estimated in the vehicle irrespective of occurrence of the clutch failure, the step for estimating the torque transmitting capacity of the clutch K0 may be omitted.

Thus, according to the control example shown in FIG. 1, the HV mode can be established if the torque sufficient to crank the engine 1 can be transmitted through the clutch K0 in trouble. Therefore, the electric power of the battery will not be consumed during the entire period of the clutch failure in which the torque transmitting capacity cannot be altered so that a traveling distance of the vehicle in the event of clutch failure can be extended. That is, a travelling distance of a limp home mode can be extended. In addition, under the HV mode, the required driving force to be delivered to the driving wheels 4 can be achieved by both the engine 1 and the motors 2 and 3. Meanwhile, under the HV mode, an engine braking force derived from a pumping loss of the engine 1 may also be applied to the driving wheels 4 so that the braking force can be ensured.

According to the preferred embodiment, the control system is further configured to bring the clutch K0 into engagement again during occurrence of failure. However, if the clutch K0 in trouble is brought into engagement abruptly, a braking force would be increased abruptly by a power loss resulting from rotating the engine 1, or otherwise a driving force would be increased abruptly by transmitting the torque of the engine 1. In both cases, shock and noise may be caused. In order to avoid such disadvantages, according to the preferred embodiment, the control system is configured to bring the clutch K0 into engagement again when the vehicle is stopped. A control example of bringing the clutch K0 into engagement will be explained with reference to FIG. 2, but detailed explanations for the common steps will be omitted.

Figure 2:
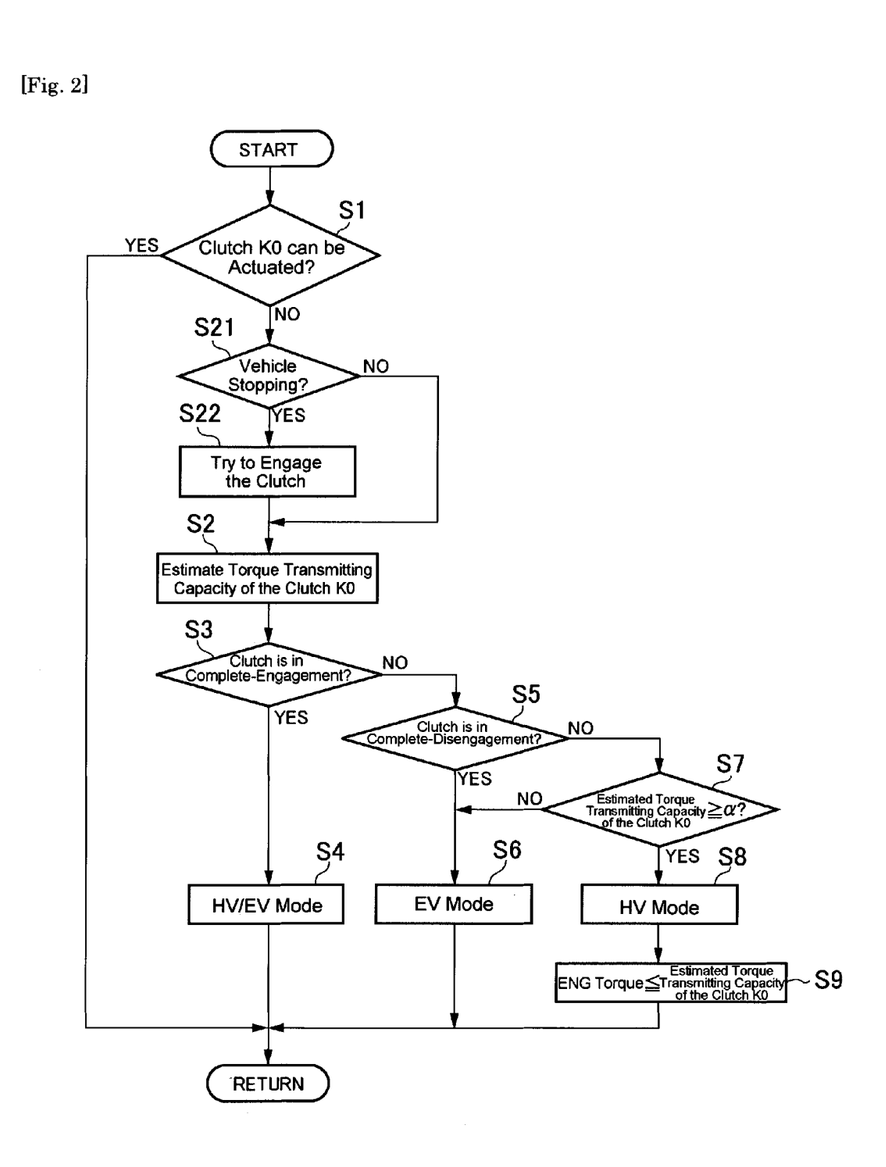
FIG. 2 is a flowchart showing a control example for bringing the clutch into engagement again in the stopping vehicle.

According to the control example shown in FIG. 2, if the torque transmitting capacity of the clutch K0 cannot be altered so that the answer of the step S1 is NO, it is determined at step S21 whether or not the vehicle is stopping. If the vehicle is running so that the answer of the step S21 is NO, the routine advances to step S2 to carry out the subsequent controls explained with reference to FIG. 1. To the contrary, if the vehicle is stopping so that the answer of the step S21 is YES, the clutch K0 is brought into engagement at step S22. Specifically, the clutch K0 can be brought into engagement by increasing the command value to actuate the actuator to the maximum value. Alternatively, the clutch K0 may also be brought into engagement by temporarily reducing a pushing force of the actuator and then increasing the pushing force of the actuator.

Thus, the control example shown in FIG. 2 is configured to try to bring the clutch K0 into engagement if the torque transmitting capacity of the clutch K0 cannot be altered by failure. According to the control example shown in FIG. 2, therefore, the torque transmitting capacity of the clutch K0 may possibly be increased to be larger than the first threshold α to increase the opportunity to establish the HV mode. For this reason, the electric power of the battery may be saved after restarting the vehicle so that a traveling distance of the vehicle may possibly be extended even if the clutch K0 is still in trouble. In addition, since such attempt of engagement of the clutch K0 is executed in the stopping vehicle, the driving force and the braking force will not be changed abruptly by trying to bring the clutch K0 into engagement. That is, such attempt of engagement of the clutch K0 can be carried out without causing shocks and noises.

In addition, if the clutch K0 is in complete-engagement, or if the estimated torque transmitting capacity of the clutch K0 is sufficient to crank the engine 1, the drive mode can be shifted from the EV mode to the HV mode by starting engine 1 according to need. Therefore, the battery is allowed to be charged by the electric powers generated by the motors 2 and 3 when the vehicle runs down a slope, and the vehicle is allowed to be accelerated according to need by shifting the drive mode to the HV mode. Besides, an output voltage of the battery may drop if the SOC is excessively low, and the battery may be damaged if the SOC is excessively high. Therefore, the SOC of the battery is preferably be controlled to fall within a predetermine range to ensure the sufficient voltage and to protect the battery. For this purpose, even if the clutch K0 is still in trouble, the EV mode still can be selected to power the vehicle by the electric power of the battery in case the SOC of the battery is higher than a predetermined level, and the HV mode still can be selected to save electricity of the battery in case the SOC of the battery is lower than a predetermined level.

Figure 3:
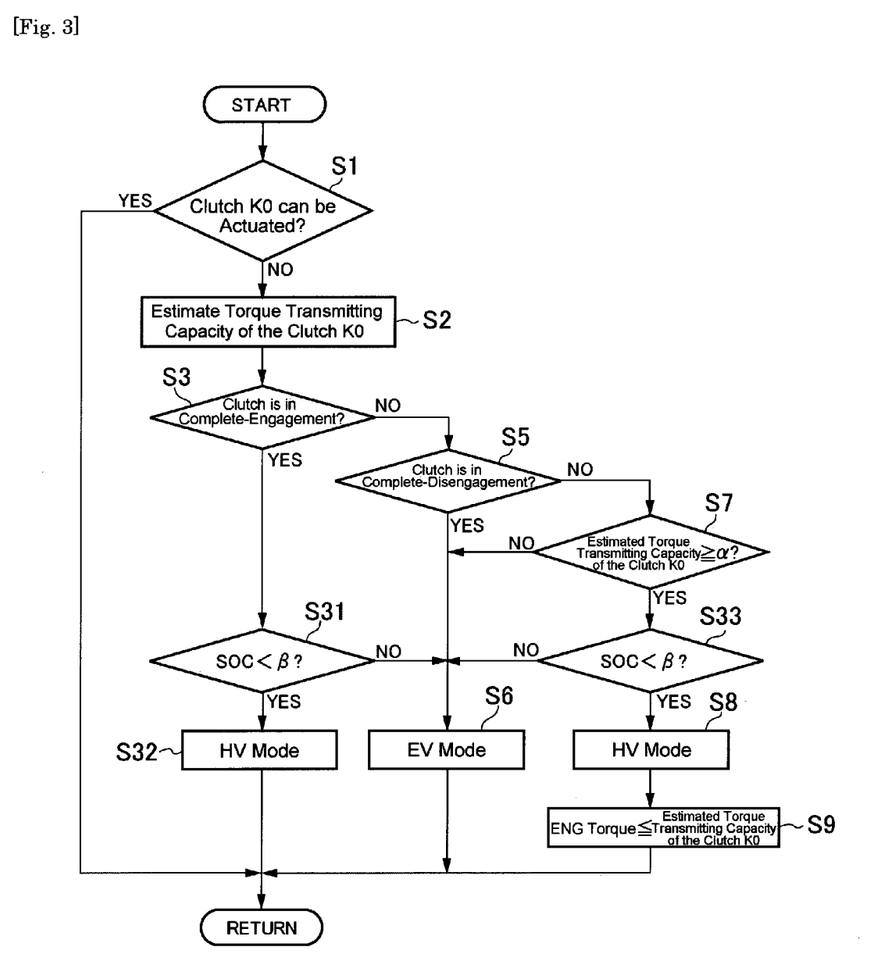
FIG. 3 is a flowchart showing a control example for shifting the drive mode in accordance with an SOC of the battery.

A control example to shift the drive mode depending on the SOC level of the battery will now be explained with reference to FIG. 3 but detailed explanations for the common steps will be omitted. According to the example shown in FIG. 3, if the clutch K0 is in complete-engagement so that the answer of the step S3 is YES, it is determined at step S31 whether or not the SOC of the battery is lower than a second threshold value β. Specifically, the second threshold value β is a lowest level of the SOC possible to crank the engine 1, and second threshold value β may be altered in accordance with a temperature etc. In addition, in order to certainly achieve the limp home mode during occurrence of the clutch failure, it is necessary to prevent the voltage drop of the battery resulting from a reduction of the SOC level. For this reason, it is preferable to set the second threshold value β higher than a third threshold value as a lowest level of the SOC to charge the battery under the normal condition of the clutch K0.

If the SOC of the battery is lower than the second threshold value β so that the answer of the step S31 is YES, the HV mode is selected at step S32. On the contrary, if the SOC of the battery is higher than the second threshold value β so that the answer of the step S31 is NO, the EV mode is selected at step S6.

As the case in which the clutch K0 is in complete-engagement, the drive mode may also be selected from the EV mode and the HV mode if the estimated torque transmitting capacity of the clutch K0 is sufficient to crank the engine 1 and hence the answer of the step S7 is YES. To this end, if the answer of step S7 is YES, then the SOC of the battery is also compared with the second threshold value β at step S33. If the SOC level of the battery is lower than the second threshold value β so that the answer of at step S33 is YES, the HV mode is selected at step S8. To the contrary, if the SOC level of the battery is higher than the second threshold value β so that the answer of at step S33 is NO, the EV mode is selected at step S6.

If the torque transmitting capacity of the clutch K0 in trouble is large enough to carry out a cranking of the engine 1, the battery can be charged by shifting the drive mode from the EV mode to the HV mode in accordance with the SOC of the battery to extend a traveling distance of the vehicle. In addition, since the second threshold value β is set to the lowest level of the SOC possible to crank the engine 1 by the motors 2 and 3, the battery can be charged before the SOC level is excessively lowered to cause a voltage drop. Therefore, the driving force and the braking force can be ensured even if the clutch K0 is still in trouble.

The control system of the preferred embodiments may be applied not only to the example shown in FIG. 4 but also examples shown in FIGS. 7 to 11 to be explained hereinafter. Here, common reference numerals are allotted to the elements in common with those in the examples shown in FIGS. 7 to 11, and detailed explanation for those common elements will be omitted.

Figure 7:
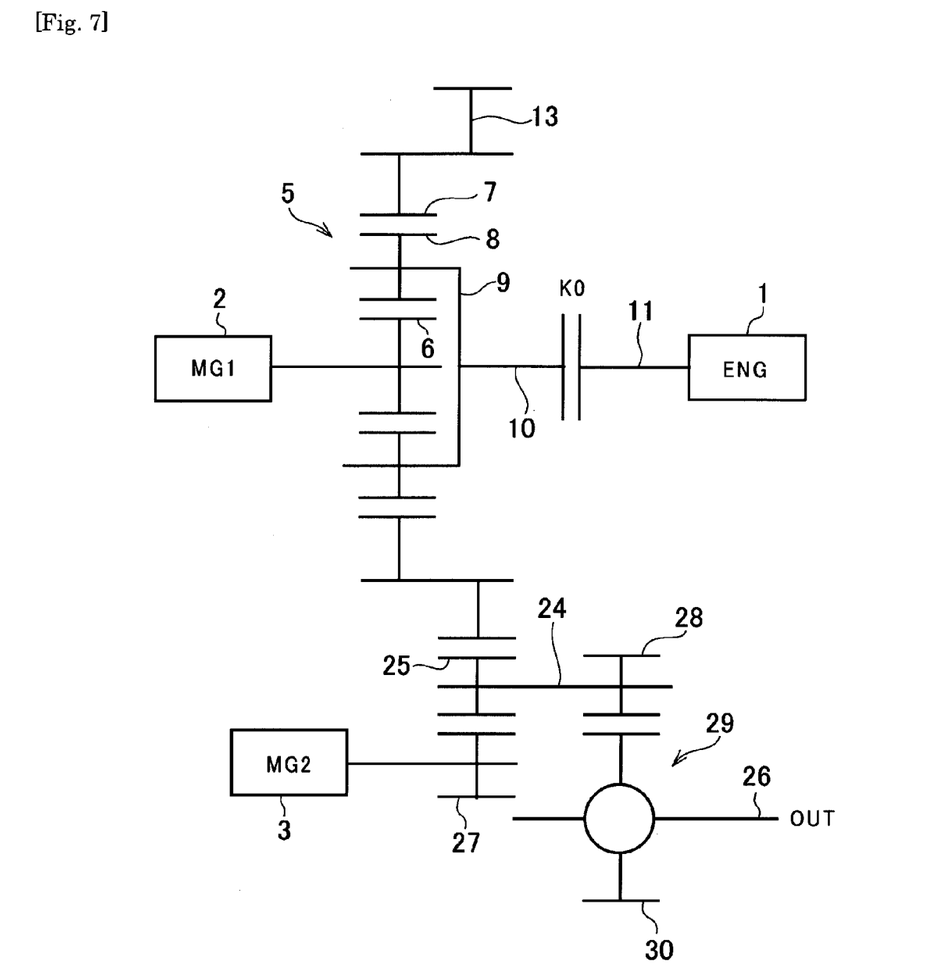
FIG. 7 is a skeleton diagram schematically showing a second example of the vehicle to which the control system of the invention is applied.

In the example shown in FIG. 7, the first motor 2 is disposed on an extension of the input shaft 10. A counter shaft 24 is arranged parallel to a rotational axis of the power distribution device 5, the first motor 2, and a counter driven gear 25 meshing with the output gear 13 is fitted onto the counter shaft 24 to be rotated integrally therewith.

Torque of the second motor 3 is added to torque transmitted from the power distribution device 5 to a drive shaft 26. To this end, the second motor 3 is arranged parallel to the counter shaft 24, and a reduction gear 27 connected the rotor of the second motor 3 is engaged with the counter driven gear 25. The reduction gear 27 is diametrically smaller than the counter driven gear 25 fitted onto the counter shaft 24 so that the torque of the second motor 3 can be transmitted thereto while being amplified.

A counter drive gear 28 is also fitted onto the other side of the counter shaft 24 to be rotated integrally therewith while meshing with a ring gear 30 of a deferential gear 29 unit serving as a final reduction gear.

Figure 8:
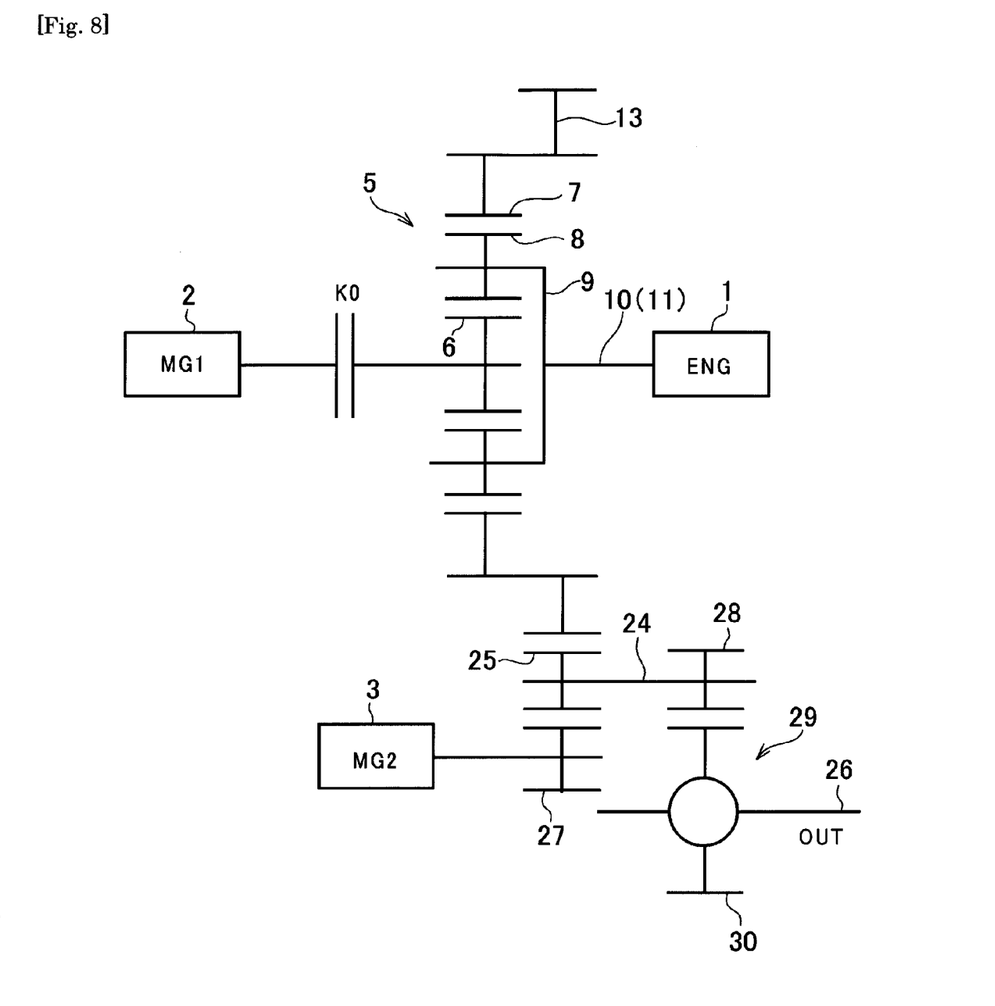
FIG. 8 is a skeleton diagram schematically showing a third example of the vehicle to which the control system of the invention is applied.
Figure 9:
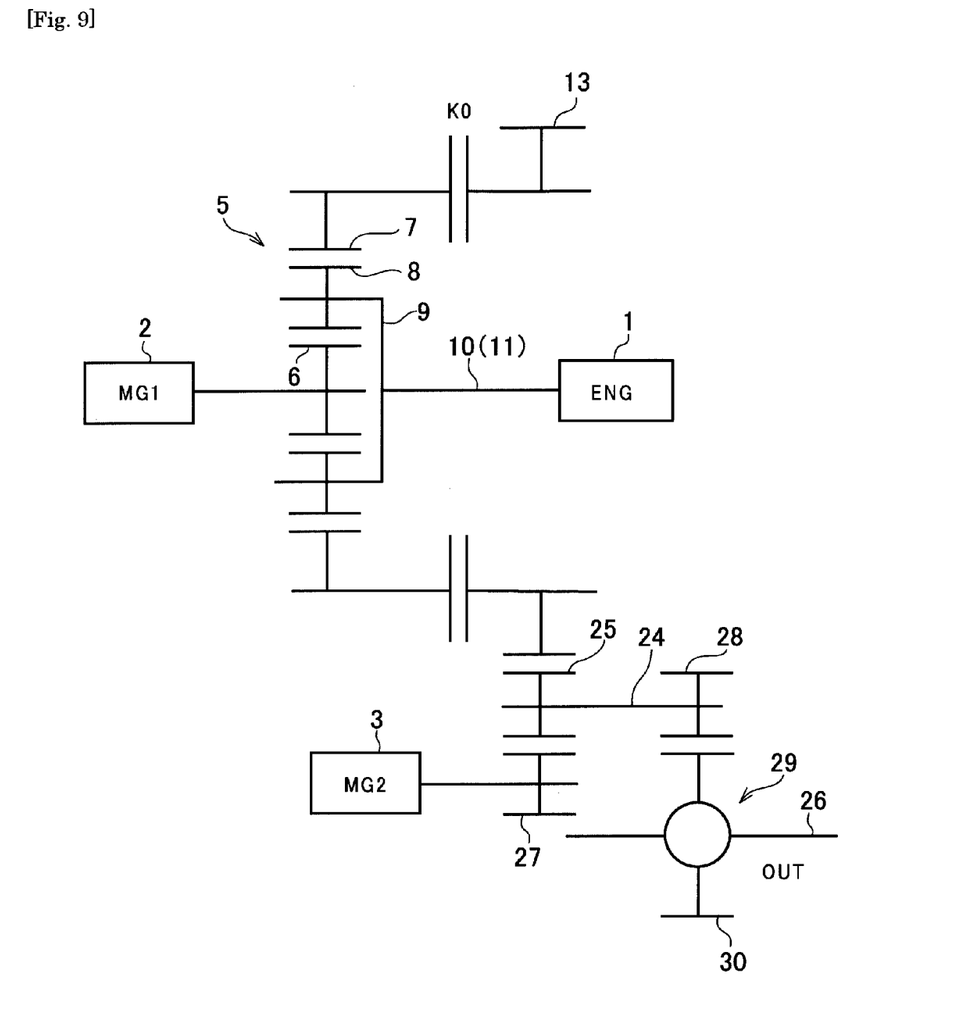
FIG. 9 is a skeleton diagram schematically showing a fourth example of the vehicle to which the control system of the invention is applied.

In the example shown in FIG. 7, the clutch K0 serving as the claimed engagement device is disposed between the input shaft 10 and the output shaft 11 to selectively interrupt the torque transmission from the engine 1 to the motor 2 and to the driving wheels. However, the power distribution device 5 can be brought into a neutral state by interrupting a torque transmission to one of the rotary elements thereof. Therefore, the clutch K0 may also be disposed between the first motor 2 and the sun gear 6 as shown in FIG. 8, or between the ring gear 7 and the output gear 13 as shown in FIG. 9.

Figure 10:
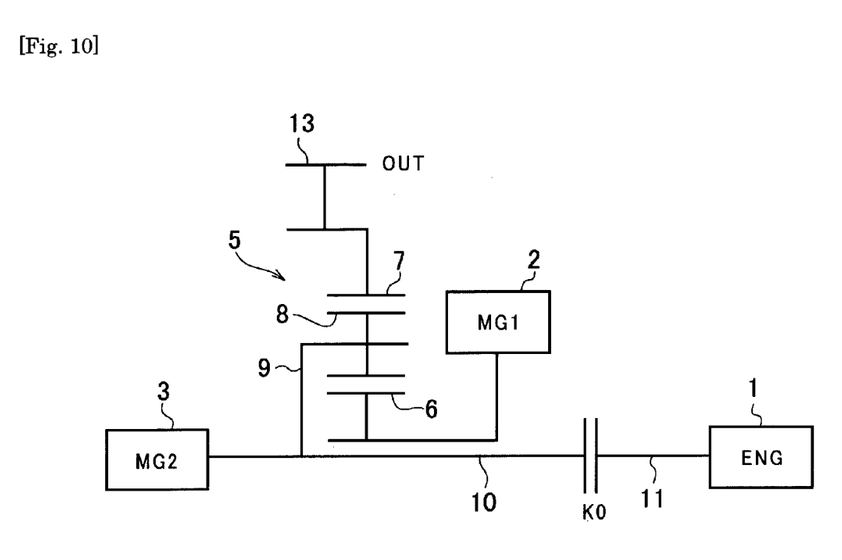
FIG. 10 is a skeleton diagram schematically showing a fifth example of the vehicle to which the control system of the invention is applied.
Figure 11:
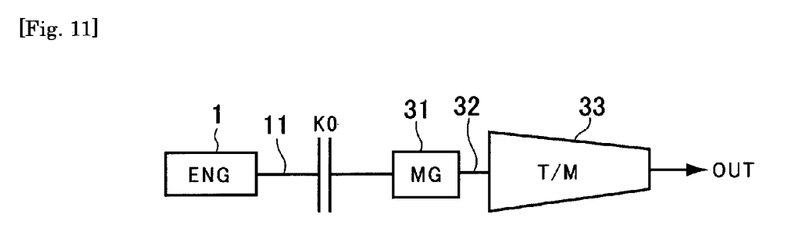
FIG. 11 is a skeleton diagram schematically showing a sixth example of the vehicle to which the control system of the invention is applied.

In addition, according to the foregoing examples, the second motor 3 is arranged in a manner to deliver the torque to an output side of the power distribution device 5. However, as shown in FIG. 10, the second motor 3 may also be arranged in a manner to transmit the torque to the input shaft 10 of the power distribution device 5.

Thus, according to the preferred examples, the battery can be charged during stopping the vehicle having the differential mechanism shown in FIG. 4 or 7 to 10 if the torque transmitting capacity of the clutch K0 in trouble is still sufficient to rotate the first motor 2 by the engine torque to generate electricity. Therefore, a possible expected travelling distance of the vehicle can be extended after restarting the vehicle.

In addition, according to the preferred examples, the power distribution device 5 serving as the differential mechanism may be omitted. Specifically, the control system may also be applied to a vehicle shown in FIG. 11 in which the output shaft 11 is connected to a motor 31 through the clutch K0, and an output shaft 32 of the motor 31 is connected to a transition (abbreviated as T/M in FIG. 11) 33.

The invention claimed is:

1. A control system for a hybrid vehicle having
    a prime mover including an engine and a motor,
    an engagement device that is disposed between the engine and the motor to selectively enable a torque transmission between the engine and the motor and between the engine and driving wheels, and a control unit that selects a drive mode of the vehicle;

wherein the control unit is configured to:

determine an occurrence of failure in which a torque transmitting capacity of the engagement device cannot be altered;

estimate the torque transmitting capacity of the engagement device;

select a first drive mode in which the vehicle is powered by the engine in case the occurrence of failure of the engagement device is determined and the estimated torque transmitting capacity of the engagement device is larger than a first threshold value;

select a second drive mode in which the vehicle is powered by the motor in case the occurrence of failure of the engagement device is determined and the estimated torque transmitting capacity of the engagement device is smaller than the first threshold value; and reduce a torque of the engine to be smaller than the estimated torque transmitting capacity of the engagement device in case the first drive mode is selected.

2. The control system for a hybrid vehicle as claimed in claim 1, wherein the control unit is further configured to try to bring the engagement device into engagement again during the vehicle is stopping, in case the occurrence of failure of the engagement device is determined.

3. The control system for a hybrid vehicle as claimed in claim 1, wherein the control unit is further configured to:

select the first drive mode in case the estimated torque transmitting capacity of the engagement device is larger than the first threshold value, and a state of charge of a battery storing electricity delivered to the motor is lower than a second threshold value; and select the second drive mode in case the estimated torque transmitting capacity of the engagement device is larger than the first threshold value, and the state of charge of the battery storing electricity delivered to the motor is higher than the second threshold value.

4. The control system for a hybrid vehicle as claimed in claim 3, wherein the second threshold value is set to be higher than a third threshold value as a lowest level of the state of charge to charge the battery under the normal condition of the engagement device.

5. The control system for a hybrid vehicle as claimed in claim 1, further comprising:

a differential mechanism comprising a first rotary element connected to the engine to serve as an input element, a second rotary element connected to the driving wheels to serve as an output element, and a third rotary element connected to a generator to serve as a reaction element; and wherein the motor is connected to any of the first rotary element and the second rotary element.

* * * * *